United States Patent [19]
Lindeman

[11] Patent Number: 6,105,094
[45] Date of Patent: *Aug. 15, 2000

[54] METHOD AND APPARATUS FOR ALLOCATING EXCLUSIVE SHARED RESOURCE REQUESTS IN A COMPUTER SYSTEM

[75] Inventor: James R. Lindeman, Fremont, Calif.

[73] Assignee: Adaptec, Inc., Milpitas, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/013,498

[22] Filed: Jan. 26, 1998

[51] Int. Cl.[7] ....................................................... G06F 13/14
[52] U.S. Cl. ........................... 710/107; 710/108; 710/240; 710/241
[58] Field of Search ..................................... 710/240, 241, 710/242, 243, 244, 107, 108, 109, 110

[56] References Cited

U.S. PATENT DOCUMENTS

| | | | |
|---|---|---|---|
| 4,719,569 | 1/1988 | Ludemann et al. | 364/200 |
| 5,528,766 | 6/1996 | Ziegler et al. | 395/293 |
| 5,533,205 | 7/1996 | Blckledge, Jr. et al. | 395/297 |
| 5,546,547 | 8/1996 | Bowes et al. | 395/294 |
| 5,640,519 | 6/1997 | Langendorf et al. | 395/291 |
| 5,758,105 | 5/1998 | Kelly et al. | 395/293 |

*Primary Examiner*—Glenn A. Auve
*Assistant Examiner*—Tim Vo
*Attorney, Agent, or Firm*—Martine Penilla & Kim, LLP

[57] ABSTRACT

A computer system incorporating an apparatus for allocating exclusive shared resource requests includes a shared resource, a first type device coupled to the shared resource and a second type device coupled to the shared resource. The computer system also includes an arbitrator unit coupled to the shared resource capable of granting the second type device exclusive access to the shared resource by preventing the first type device from being granted exclusive access to the shared resource. The arbitrator unit prevents the first type device from being granted exclusive access to the shared resource for at least a duration of time after the second type device has completed an associated second type shared resource transaction.

19 Claims, 6 Drawing Sheets

METHOD AND APPARATUS FOR ALLOCATING EXCLUSIVE SHARED RESOURCE REQUESTS IN A COMPUTER SYSTEM

FIELD OF THE INVENTION

The present invention pertains to allocating access to a shared resource in a computer system. More particularly, the present invention provides a personal computer architecture that allows for the capture and the display of isochronous digital video data.

BACKGROUND OF THE INVENTION

The ability of personal computers (PCs) to use video has grown dramatically in recent years. The advent of telecommuting and real time video conferencing has greatly expanded the applications used to capture and display digital video (DV) data in a personal computer system.

Figure 1:
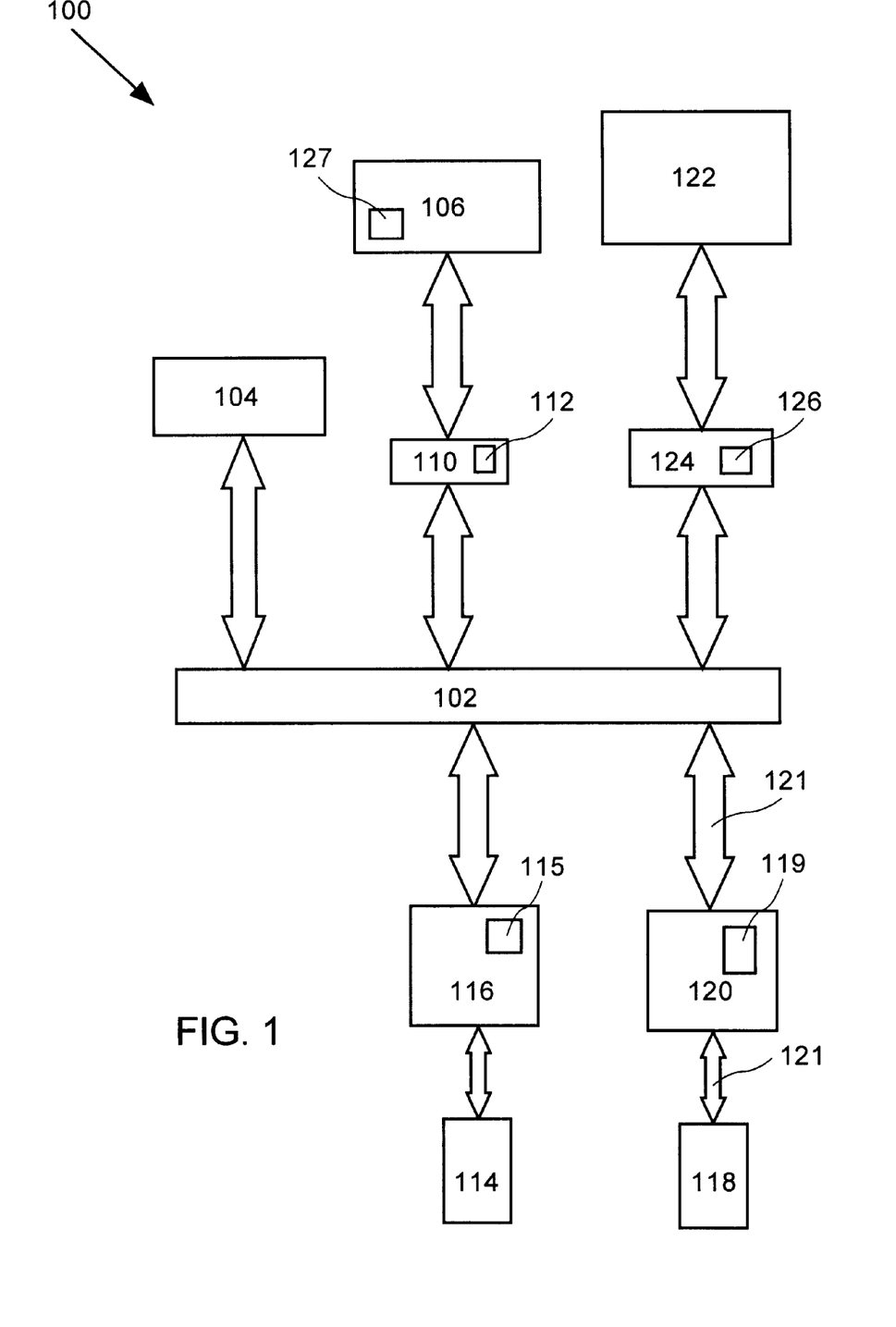
FIG. 1 is a conventional personal computer architecture.

A representative personal computer (PC) system suitable for the capture and display of DV data is shown in FIG. 1. In general, the personal computer 100 includes a bus 102 used for communicating information, a host processor 104 coupled with the bus 102 for processing information and instructions, a computer main memory unit 106 (e.g., random access memory unit) coupled to the bus 102 by way of a bus controller 110 used to arbitrate access to the main memory unit 106. The bus controller 110 includes a first in first out (FIFO) buffer 112 used to queue data waiting to be stored in the main memory unit 106. The personal computer 100 also includes a data storage device 114 such as a magnetic or optical disk and/or disk drive capable of storing information and instructions. Such information includes digital video (DV) data. The data storage device 114 is coupled to the bus 102 by way of a data storage host controller 116 used to mediate access of the data storage device 114 to the bus 102. The data storage host controller 116 also includes a data storage host FIFO buffer 115 used to queue in-transit data. The personal computer 100 also includes an isochronous DV data unit 118 coupled to the bus 102 by way of a DV host controller 120 used to mediate access of the DV data unit 118 to the bus 102. The DV host controller 118 includes a FIFO buffer 119 capable of queuing DV data waiting to be transmitted during the correct channel time slot. DV data may be transmitted over a serial bus 121 using any type of transmission protocol. One example of such a transmission protocol for the serial bus 121, which may be used to transmit DV data, is referred to as the IEEE standard 1394. Other transmission protocols, such as those used by Sony or Panasonic, may also be used to transmit DV data. The DV host controller 120 generally receives and transmits isochronous data such as DV data over the serial bus 121.

The personal computer 100 also includes a display monitor 122 coupled to the bus 102. The display monitor 122 is suitable for generating a display from display information supplied by a graphics hardware card 124 coupled to the bus 102. The graphics hardware card 124 contains a display processor 126 which executes a series of display instructions found within a display list. The host processor 104 or display processor 126 supplies data and control signals to a frame buffer which refreshes the display device 122 for rendering images on the display device 122.

In order to display DV data stored in the data storage device 114, for example, the data storage host controller 116 retrieves the appropriate DV data from the data storage device 114 and, if necessary, queues it in the data storage host controller FIFO buffer 115. Under control of the system processor 104, the data storage host controller 116 sends the DV data to the bus 102 to be "written" to a data buffer 127 located in the system main memory device 106 under control of the bus controller 110. The DV data stored in the data buffer 127 is then passed to the DV data host controller 120 by way of the bus 102 under the control of the bus controller 110. The DV data is queued in the DV data host FIFO buffer 119 until an appropriate time channel is available, at which time the DV data is passed to the DV data unit 118 by way of the serial bus 121.

Unfortunately, current PC operating systems such as Win95™ and System 7™ are not real-time operating systems. Typically, data from the data storage device 114 is requested in large blocks and is referred to as being asynchronous in nature. By asynchronous in nature it is meant that there is no temporal relationship with the delivery of data, and consequently, data may arrive in large blocks. The most serious bottleneck in the transfer of DV data occurs when the FIFO buffer 112 included in the bus controller 110 transfers large blocks of data to the main system memory device 106. This "flushing" of data from the FIFO buffer 112 interrupts the flow of DV data since the bus 102 is no longer accessible. This interruption in the transfer of the DV data causes the DV controller 120 to "miss" time slots or time channels critical for the proper capture and/or display of the DV data. In a typical isochronous DV data transfer, any DV data packet must be available at regular intervals having a period of, for example, 125 μs.

However, the bus controller 110 generally follows arbitration algorithms which give devices such as the data storage host controller 116 priority access to the bus 102. In this manner, devices writing data to the system main memory 106 by way of bus 102 as controlled by the bus controller 110 make the bus 102 inaccessible to other devices for long periods of time. By way of example, if a large block of data is being transferred to the system main memory device 106, the bus controller 110 must temporarily store the large block of data in the FIFO buffer 112 due to long write cycle times associated with the system main memory device 106. The large block of data stored in the FIFO buffer 112 must then be transferred, or "flushed", to the system main memory 106 over a period of time which may be substantially longer than the time slot or time channel available for DV data transfer.

Unfortunately, any additional write requests from any device to the system main memory device 106 are typically given priority over any read request by the bus controller 10 since reads are "blocked" until the write FIFO buffer is "flushed". The prioritization of the additional write requests further increases the time the DV data controller 120 cannot read DV data from the system main memory device 106. This "starving" of the device requesting DV data from the system main memory device 106 often causes the DV data controller 120 to have insufficient data for the next isochronous time channel. This lack of data causes the DV data controller to "miss" a time channel resulting in potential frame data loss or frame synchronization problems.

Therefore, a method and an apparatus for guaranteeing the bandwidth of an isochronous data transfer in a personal computer system is needed.

SUMMARY OF THE INVENTION

A method and apparatus for allocating exclusive shared resource requests in a computer system are disclosed. In one aspect of the invention, a computer system incorporating an apparatus for allocating exclusive shared resource requests is disclosed. The computer system includes a shared resource. The computer system also includes a first type device coupled to the shared resource and a second type device coupled to the shared resource. The computer system also includes an arbitrator unit coupled to the shared resource capable of granting the second type device exclusive access to the shared resource by preventing the first type device from being granted exclusive access to the shared resource. The arbitrator unit prevents the first type device from exclusive access to the shared resource for at least a duration of time after the second type device has completed an associated second type shared resource transaction.

In another aspect of the invention, a method of assuring the bandwidth of an isochronous data transfer is disclosed. The method includes the following operative steps. First, a first type shared resource access request and a second type shared resource access request are generated. The first type shared resource access request is generated when a first type device desires exclusive access to the shared resource in order to perform an associated first type shared resource transaction. The second type shared resource access request is generated when a second type device desires exclusive access to the shared resource in order to perform an associated second type shared resource transaction. Next, a second type device shared resource access grant allowing the second type device exclusive access to the shared resource is generated if it is determined that the first type device does not have exclusive access to the shared resource and there are no first type device shared resource access grants that are active. The second type device shared resource access grant allows the second type device exclusive access to the shared resource until the passing of a time-out period of time after a last associated second type device shared resource transaction has been completed. After the passing of the time-out period of time, a first type device shared resource access grant is generated allowing the first type device exclusive access to the shared resource.

In yet another aspect of the invention, a computer system having a bus arbiter unit capable of assuring an isochronous bandwidth during capture and display of digital video data is disclosed. The computer system includes a first bus capable of passing data signals and control signals and a computer system memory device capable of storing data coupled to the bus. The computer system further includes a first bus controller device connected to the computer system memory device and the first bus. The first bus controller being suitably arranged to control the passing of data from the first bus to the computer system memory device and the passing of data from the computer system main memory device to the first bus.

The computer system includes a bus to bus coupling device connected to the first bus as well as a second bus connected by way of the bus to bus coupling device to the first bus. A first device and a second device are coupled to the second bus. A bus access arbiter unit is coupled to the shared resource capable of granting exclusive access to the second type device of the shared resource by preventing the first type device from being granted exclusive access to the shared resource. The bus access arbiter unit prevents the first type device from gaining exclusive access to the shared resource for at least a duration of time after the second type device has completed an associated second type shared resource transaction.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following detailed description of the present invention, numerous specific details are set forth in order to provide a thorough understanding of the present invention. However, it will be obvious to one skilled in the art that the present invention may be practiced without these specific details or by using alternate elements or processes. In other instances well known processes, procedures, components, and circuits have not been described in detail so as not to unnecessarily obscure aspects of the present invention.

Some portions of the detailed descriptions which follow are presented in terms of procedures, logic blocks, processing, and other symbolic representations of operations on data bits within a computer memory. A procedure, logic block, process, etc., is herein, and generally, conceived to be a self-consistent sequence of steps or instructions leading to a desired result. The steps are those requiring physical manipulations of physical quantities. Usually, though not necessarily, these physical manipulations take the form of electrical or magnetic signals capable of being stored, transferred, combined, compared, and otherwise manipulated in a computer system. Herein, these signals are referred to as bits, values, elements, symbols, or the like with reference to the present invention.

It should be borne in mind, however, that all of these terms are to be interpreted as referencing physical manipulations and quantities and are merely convenient labels and are to be interpreted further in view of terms commonly used in the art. Unless specifically stated otherwise as apparent from the following discussions, it is understood that terms such as "processing", "performing", "decoding", "determining", "building" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission or display devices.

According to one aspect of the present invention a shared resource access controller assures an isochronous bandwidth for capturing and displaying digital video (DV) data in a personal computer system. The present invention provides a personal computer system capable of capturing and displaying DV data without loss of DV data due to insufficient access to a system main memory device coupled to a system bus. The present invention allows a DV data controller included in the personal computer system sufficient access to a system main memory device to avoid the loss of DV data during an isochronous data transfer.

Figure 2:
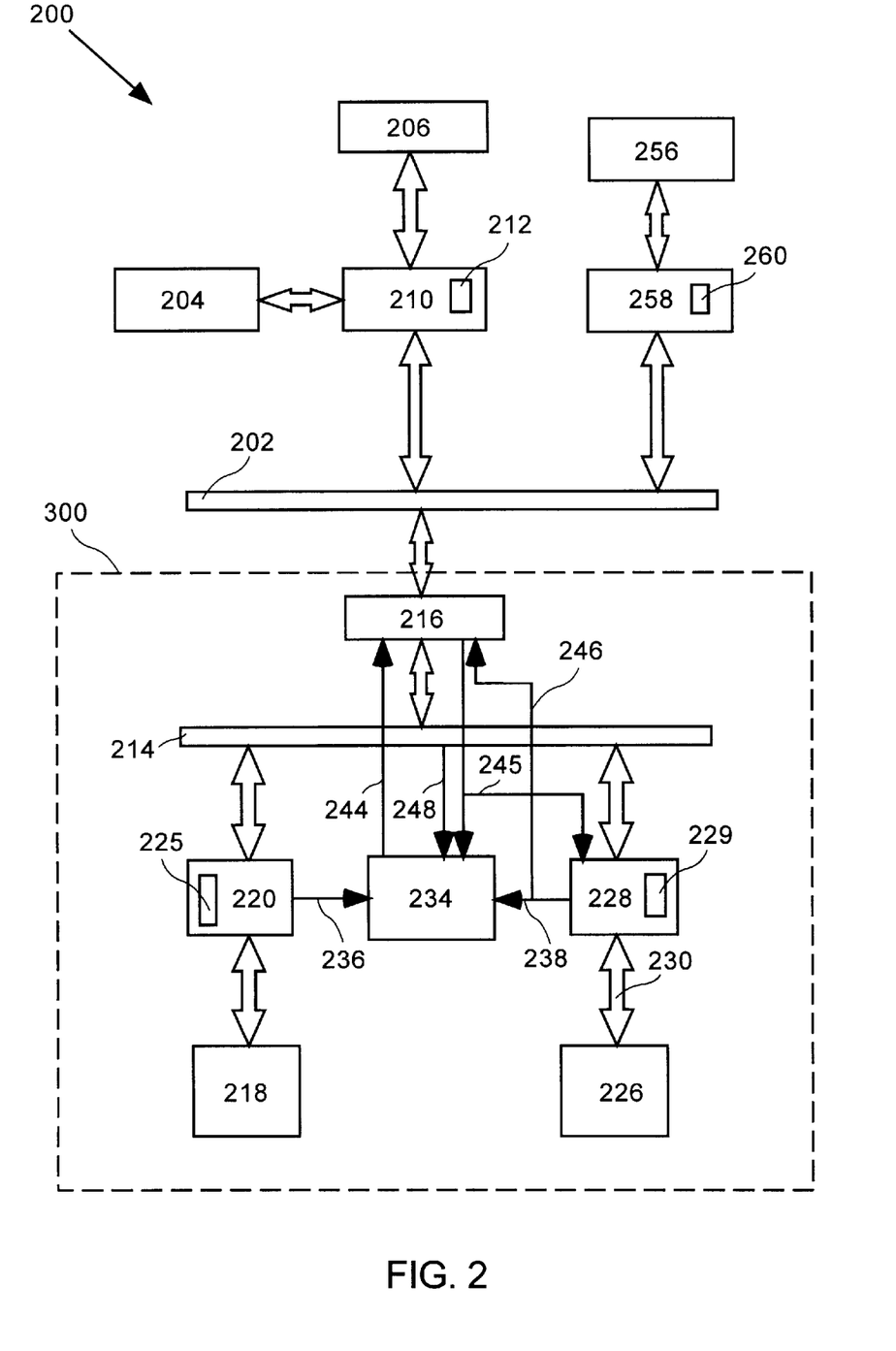
FIG. 2 is a diagram representing a personal computer architecture incorporating a shared resource controller for assuring the bandwidth of an isochronous data transfer in accordance with an embodiment of the invention.

A representative personal computer (PC) system suitable for the capture and display of DV data is shown in FIG. 2. In general, the personal computer 200 includes a system primary bus 202 used for communicating information. In a preferred embodiment, the system primary bus 202 can take the form of a PCI bus having, for example, a clock speed of 33 Mhz (megahertz) and a 32 bit data path offering a transfer rate of 132 Mbytes/second. The personal computer 200 also includes a host processor 204 coupled to the system primary bus 202 capable of processing information and instructions and a computer main memory unit 206 (e.g., random access memory unit) coupled to the system primary bus 202 by way of a bus controller 210. In the described embodiment, the bus controller 210 uses an arbitration algorithm that preferentially grants access to the system primary bus 202 to those devices transferring large blocks of data to the computer main memory unit 206. The bus controller 210 includes a first in first out (FIFO) buffer 212 used to queue data waiting to be stored in the computer main memory unit 206.

The personal computer 200 also includes a display monitor 256 coupled to the system primary bus 202 by way of a hardware card 258. The display monitor 256 being suitable to generate a display from display information supplied by the graphics hardware card 258. The graphics hardware card 258 may contain a display processor 260 which executes a series of display instructions found within a display list. The host processor 204 or display processor 260 supplies data signals and control signals suitable for rendering images on the display monitor 256.

As shown by a representative section 300, the personal computer 200 also includes a system secondary bus 214 coupled to the system primary bus 202 by way of a bus to bus bridge controller device 216. In a preferred embodiment, the system secondary bus 214 can also take the form of the PCI bus as described hereinabove. The representative section 300 further includes a data storage device 218 such as a magnetic or optical disk and/or disk drive capable of storing information such as, for example, captured DV data. The data storage device 218 is coupled to the bus 214 by way of a data storage host controller 220. The data storage host controller 220 can also include a data storage host FIFO buffer 225 used to queue in-transit data. The personal computer 200 also includes an isochronous DV data unit 226 coupled to the system secondary bus 214 by way of a DV host controller 228. The DV host controller 228 can be used to mediate access of the isochronous DV data unit 226 to the system secondary bus 214. The DV host controller 228 can also include a DV host FIFO buffer 229 capable of queuing in-transit DV data.

DV data may be transmitted over a serial bus 230 using any type of transmission protocol. One example of a transmission protocol for the serial bus 230 which may be used to transmit DV data is referred to as the IEEE standard 1394. Other transmission protocols, such as those used by Sony or Panasonic, may also be used to transmit DV data. The DV host controller 228 generally receives and transmits DV data over the serial bus 230.

In a preferred embodiment, the personal computer 200 includes a bus request controller unit 234 shown in the representative section 300 coupled to the data storage host controller 220 and the DV data host controller 228. It should be noted that the bus request controller unit 234 can be implemented as an integrated circuit device in one embodiment. An example of such an integrated device is that of a programmable logic device well known in the art for possessing the capability of real time reconfiguration. One such example of a programmable logic device capable of being used to implement the bus request controller unit 234 is represented by the family of programmable logic devices manufactured by Altera Corp. of San Jose, Calif. The bus request controller unit 234 can receive an asynchronous type bus access request 236 from the data storage host controller 220. The bus request controller unit 234 can also receive a isochronous type bus access request 238 from the DV data host controller 228.

The asynchronous type bus access request 236 can be associated with an asynchronous data transfer mode 240 associated with, for example, the data storage device 218. It should be noted that the asynchronous data transfer mode 240 is one in which there is no temporal relationship with the delivery of data to the system main memory device 206 and consequently data can arrive in large bursts. On the other hand, the isochronous type bus access request 238 can be associated with an isochronous data transfer mode 242 associated with, for example, the isochronous DV data unit 226. By isochronous, it is meant that there is a definite and critical temporal relationship between the delivery of data packets to/or from the main system memory device 206 and the isochronous DV data unit 226. In the described embodiment, in the isochronous data transfer mode 242 any data packet not delivered to the isochronous DV data unit 226 within its allocated time slot can be lost. Therefore, it is of paramount importance that any device using the isochronous data transfer mode 242, such as for example the DV data unit 226, be allocated sufficient uninterrupted exclusive access to the system primary bus 202 to complete the associated isochronous data transfer.

Therefore, the bus request controller unit 234 can assure that a device such as the DV data unit 226 for example, using the isochronous data transfer mode 242, has uninterrupted access to the computer main memory unit 206 by way of the system primary bus 202 until it has completed the required transfer of DV data.

By way of example, when the isochronous DV data unit 226 requires exclusive access to the computer main memory unit 206 by way of the system primary bus 202, the DV data host controller 228 generates the isochronous type bus access request 238. The isochronous type bus access request 238 and isochronous type bus access grant 245 are monitored by the bus request controller unit 234. If the bus to bus bridge controller device 216 grants the bus 214 to the DV data unit 226 by way of the isochronous type bus access grant 245, the bus request controller unit 234 will not forward an asynchronous bus access request 244 to the bus to bus bridge controller device 216 until the isochronous DV data unit 226 has completed transfer. At the end of the transfer, indicated by a bus idle flag 248, a period of time referred to as a time out cycle begins. During this period of time the bus request controller unit 234 will continue to block an asynchronous bus access request 244 to the bus to bus bridge controller 216. After the time out cycle completes, and, if another isochronous type bus access request 238 is not detected, the asynchronous bus access request 244 will be forwarded to the bus to bus bridge controller device 216 and the asynchronous data transfer can proceed. However, if another isochronous type bus access request 238 is detected, the asynchronous bus access request 244 will continue to be blocked until this isochronous transfer is complete and a subsequent time out cycle completes. In this manner, the bus request controller 234 allows the isochronous DV data unit 226 exclusive access to the computer main memory unit 206 by way of the system primary bus 202 until the DV data host controller 228 has fully transferred all associated DV data.

Figure 3:
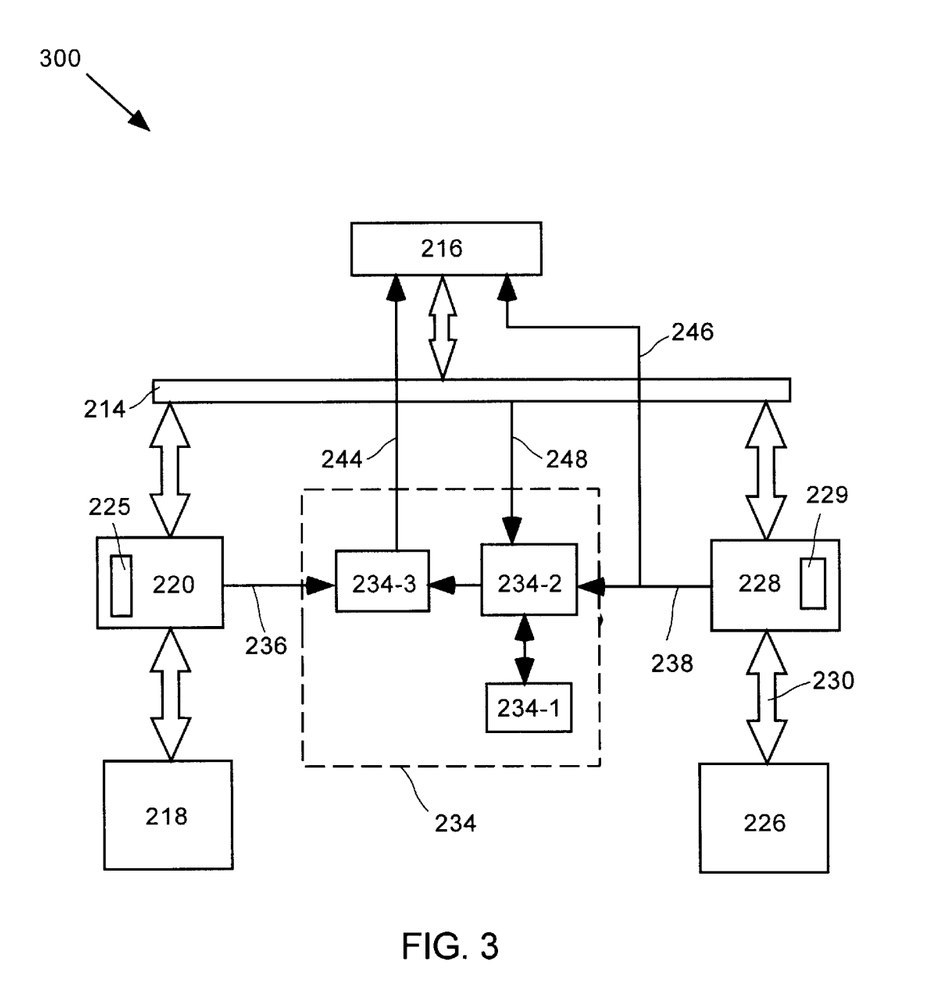
FIG. 3 is a block diagram of a personal computer architecture incorporating a shared resource controller highlighting a shared resource request arbiter unit, a timer unit, and a switch unit in accordance with an embodiment of the invention.

FIG. 3 is a block diagram of the representative section 300 highlighting the bus request controller unit 234 in accordance with an embodiment of the invention. The bus request controller unit 234 includes a bus request controller arbiter unit 234-2 coupled to a bus request controller timer unit 234-1 as well as an asynchronous access request buffer unit 234-3. The bus request controller arbiter unit 234-2 can prevent the data storage host controller 220 from gaining exclusive access to the computer main memory unit 206 by way of the system primary bus 202 during the time the DV host controller 228 is transferring data from the computer main memory unit 206 in the isochronous data transfer mode 242. The bus request controller arbiter unit 234-2 prevents the data storage host controller 220 from gaining exclusive access to the computer main memory unit 206 by way of the system primary bus 202 by causing the asynchronous access request buffer unit 234-3 to retain any asynchronous type bus access requests 236. The asynchronous access request buffer unit 234-3 retains any asynchronous type bus access requests 236 until the passage of the period of time referred to as the time-out cycle 250 after the receipt of the bus idle flag 248 by the bus request controller arbiter unit 234-2. In a preferred embodiment, the time-out cycle 250 can be determined by the bus request controller timer unit 234-1. In this manner, the bus request controller unit 234 can maintain the isochronous data transfer bandwidth of the DV host controller 228.

By way of example, when the isochronous DV data unit 226 requires access to the computer main memory unit 206 by way of the system primary bus 202, the DV data host controller 228 generates the isochronous type bus access request 238. The isochronous type bus access request 238 is in turn passed to the bus request controller arbiter unit 234-2 included in the bus request controller unit 234. The bus request controller arbiter unit 234-2 then determines if the data storage host controller 220 currently has exclusive access to the system primary bus 202. The bus request controller arbiter unit 234-2 also substantially simultaneously determines if the data storage host controller 220, though not currently having exclusive access to the system primary bus 202, has initiated a data transfer that has not completed. If it is determined that the pending asynchronous transfer has not completed and the data storage host controller 220 does not currently have exclusive access to the computer main memory unit 206 by way of the system primary bus 202, then the bus request controller arbiter unit 234-2 directs the asynchronous access request buffer unit 234-3 to retain the asynchronous type bus access requests 236. By retaining the asynchronous type bus access requests 236, no asynchronous access request 244 is forwarded thereby preventing the data storage host controller 220 from gaining exclusive access to the computer main memory unit 206 by way of the system primary bus 202.

In a preferred embodiment, when the DV data host controller 228 has completed transferring data from the computer main memory unit 206 by way of the system primary bus 202, the bus idle flag 248 can be passed to the bus request controller arbiter unit 234-2. The bus request controller arbiter unit 234-2 then continues to direct the asynchronous access request buffer unit 234-3 to store the asynchronous type bus access request 236 until at least the passage of the period of time referred to as the time-out cycle 250 as determined by the bus request controller timer unit 234-1. If during the time out cycle, another isochronous type bus request 238 is passed to the bus request controller arbiter unit 234-2, the bus request controller arbiter unit 234-2 will continue to direct the asynchronous access request buffer unit 234-3 to store the asynchronous type bus access requests 236 until the data transfer is complete and a new time out cycle has completed. In this manner, any isochronous access requests 246 generated by the DV data host controller 228 are executed during the period the DV data host controller 228 has exclusive access to the computer main memory unit 206 by way of the system primary bus 202. After the passage of the period of time referred to as the time-out cycle 250, the bus request controller arbiter unit 234-2 directs the asynchronous access request buffer unit 234-3 to release the retained asynchronous type bus access request 236. In so doing, the associated asynchronous access request 244 is generated and passed to the bus to bus bridge controller device 216 thereby allowing the data storage host controller 220 exclusive access to the computer main memory unit 206 by way of the system primary bus 202.

Figure 4:
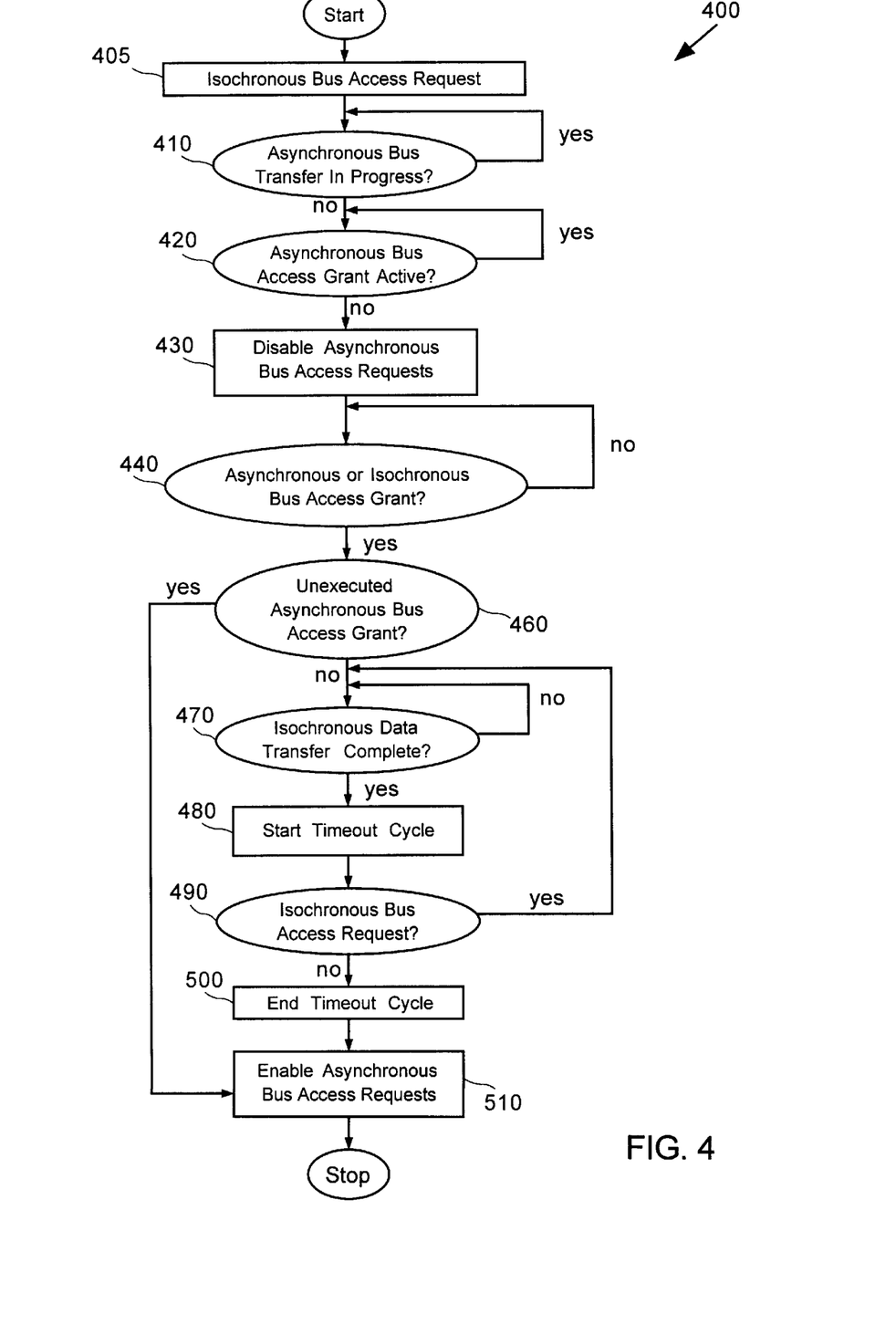
FIG. 4 is a flowchart detailing a method of maintaining the bandwidth of an isochronous data transfer in accordance with an embodiment of the invention.

FIG. 4 is a flowchart detailing a method 400 of assuring an isochronous bandwidth for the capture and display of DV data in a computer system 200 according to an embodiment of the invention. The method of assuring an isochronous bandwidth for the capture and display of DV data in the computer system 200 begins with the isochronous bus access request 405 followed by determination 410 of whether an asynchronous bus data transfer is in progress. If it is determined that there is no asynchronous bus data transfer in progress, then it is determined 420 if the asynchronous bus access grant is active. If it is determined that the asynchronous bus access grant is not active, then the generation of the asynchronous bus access request is disabled 430. By disabled it is meant that no additional asynchronous bus access requests can be generated while DV data is being transferred. Next, either an isochronous bus access grant or an asynchronous bus access grant is generated 440. Next, it is determined 460 if there is an unexecuted asynchronous bus access grant. If it is determined there is an unexecuted asynchronous bus access grant then the asynchronous data transfer is allowed to proceed. In this manner, the possibility of deadlocking the computer system 200 is avoided. If, however, it is determined that there are no unexecuted asynchronous bus access grants, then the isochronous data transfer is allowed to proceed 470. The associated isochronous bus access grant allows the transfer of DV data along the system primary bus 202.

When the isochronous data transfer is complete, a time-out cycle counter initiates a time-out cycle 480. Any additional isochronous data requests 490 are allowed to commence their associated isochronous data transfers (if requested) during the time-out cycle since asynchronous requests are still disabled. In so doing, it is assured that all associated DV data is transferred prior to enabling the asynchronous data transfer mode. At the conclusion of the time-out cycle 500, the asynchronous bus access requests are enabled 510 thereby allowing any asynchronous data transfer by way of the system primary bus to proceed.

Figure 5:
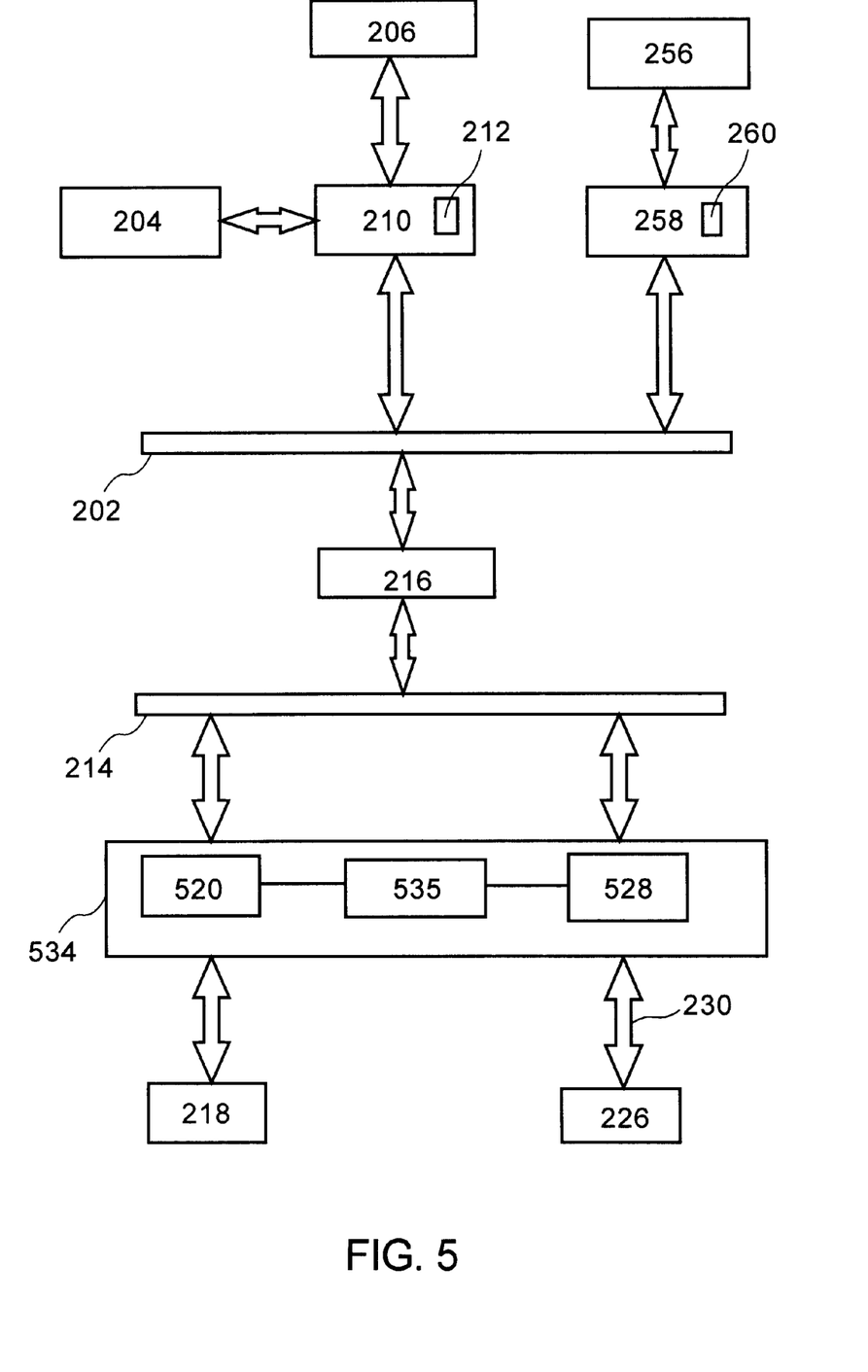
FIG. 5 is an apparatus for maintaining the bandwidth of an isochronous data transfer in accordance with another embodiment of the invention.

FIG. 5 illustrates a bus request controller unit 534 in accordance with another embodiment of the invention. As discussed hereinabove, the bus request controller unit 534 can be implemented as an integrated circuit device and more specifically as a programmable logic device. In the described embodiment, the bus request controller unit 534 includes a bus access arbiter unit 535 connected to both a DV host controller 528 and a data storage host controller 520 in a single integrated circuit configuration. In this manner, the number of integrated circuits required is reduced thereby reducing the overall cost of implementation.

Figure 6:
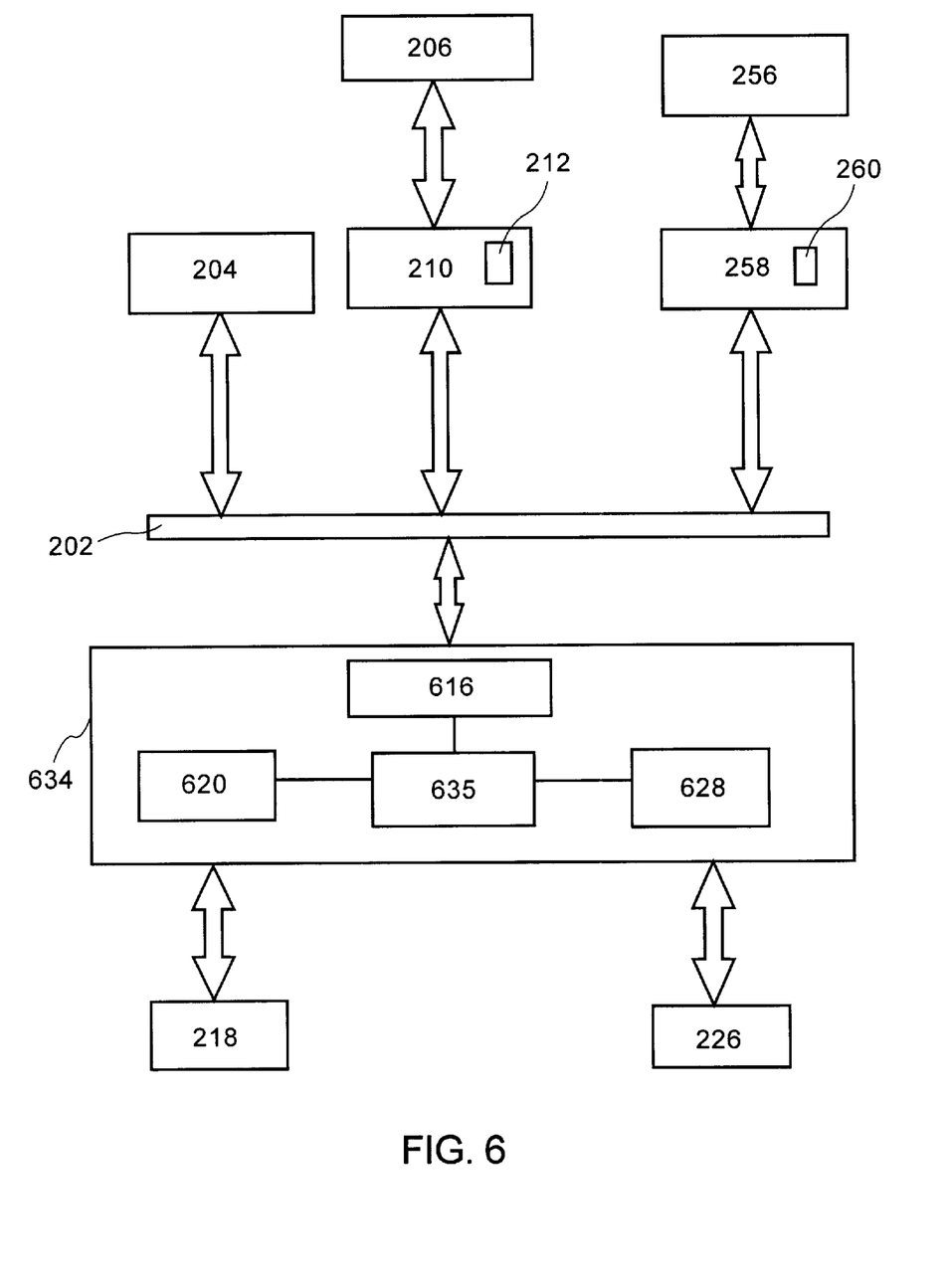
FIG. 6 is an apparatus for maintaining the bandwidth of an isochronous data transfer in accordance with yet another embodiment of the invention.

FIG. 6 illustrates a bus request controller unit 634 in accordance with yet another embodiment of the invention. As discussed hereinabove, the bus request controller unit 634 can be implemented as an integrated circuit device and more specifically as a programmable logic device. In the described embodiment, the bus request controller unit 634 includes a bus access arbiter unit 635 connected to a DV host controller 628, a data storage host controller 620, and a bus to bus bridge controller device 616 in a single integrated circuit configuration. In this manner, the bus request controller unite 634 can be connected directly to the system primary bus 202 using a single integrated circuit implementation thereby reducing overall system cost.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the claims appended hereto and their equivalents.

What is claimed is:

1. A computer system having a shared resource access controller, comprising:

a shared resource being a system secondary bus that couples to a system primary bus over a bus-to-bus bridge;

a first type device coupled to the shared resource;

a second type device coupled to the shared resource; and an arbitrator unit coupled between the first type device and the second type device, the arbitrator unit includes an asynchronous access grant buffer unit to retain access requests from the first type device before access is requested from the shared resource, the arbitrator unit being capable of granting exclusive access to the second type device that is coupled to the shared resource and preventing the first type device from being granted exclusive access to the shared resource while the access requests from the first type device remain in the asynchronous access buffer unit, wherein the arbitrator unit prevents the first type device from exclusive access to the shared resource for at least a duration of time after the second type device has completed an associated second type shared resource transaction.

2. A computer system having a shared resource access controller as recited in claim 1 wherein the first type device passes data to the shared resource during an associated first type shared resource transaction.

3. A computer system having a shared resource access controller as recited in claim 2 further including:

a processor unit coupled to the computer system bus, the processor unit processes data and generates computer system operation instructions, the processor unit directs and controls the first type device and the second type device; and a computer system main memory device coupled to the computer system bus, the computer system main memory device stores data.

4. A computer system having a shared resource access controller as recited in claim 3 wherein the first type device is an asynchronous device.

5. A computer system having a shared resource access controller as recited in claim 4 wherein the first type shared resource transaction passes asynchronous data in an asynchronous manner.

6. A computer system having a shared resource access controller as recited in claim 5 wherein the second type device is an isochronous device.

7. A computer system having a shared resource access controller as recited in claim 6, wherein the second type shared resource transaction passes isochronous data in an isochronous manner.

8. A computer system having a shared resource access controller as recited in claim 7, wherein the isochronous data is digital video data.

9. A computer system having a shared resource access controller as recited in claim 8, wherein the duration of time is approximately 125 μsec.

10. A computer system having a shared resource access controller as recited in claim 9, wherein the computer system bus is a PCI bus.

11. A method of controlling access to a shared resource in a computing system, comprising:

generating a first type shared resource access request when a first type device desires exclusive access to the shared resource so as to perform an associated first type shared resource transaction;

generating a second type shared resource access request when a second type device desires exclusive access to the shared resource so as to perform an associated second type shared resource transaction;

determining if any first type device has exclusive access to the shared resource;

determining if a shared resource access grant is outstanding for any first type device;

directing an asynchronous access grant buffer unit to retain any first type shared resource access requests if it was determined that no first type device has exclusive access to the shared resource and no shared resource access grant is outstanding for any first type device;

generating a second type device shared resource access grant, the second type device shared resource access grant allowing the second type device exclusive access to the shared resource so long as any first type resource access request is retained in the asynchronous access grant buffer unit;

allowing the second type device exclusive access to the shared resource by retaining any first type resource access request in the asynchronous grant access buffer until a time period after a last associated second type device shared resource transaction has been completed; and releasing any first type resource access requests from the asynchronous access grant buffer unit to generate a first type device shared resource access grant.

12. A method of controlling access to a shared resource in a computing system as recited in claim 11, wherein the first type device passes data to the shared resource during an associated first type shared resource transaction.

13. A method of controlling access to a shared resource in a computing system as recited in claim 11, wherein the computer system includes:

a processor unit coupled to the computer system bus, the processor unit processes data and generates computer system operation instructions, the processor unit directs and controls the first type device and the second type device; and a computer system main memory device coupled to the computer system bus, the computer system main memory device stores data.

14. A method of controlling access to a shared resource in a computing system as recited in claim 11, wherein the first type device is an asynchronous device.

15. A method of controlling access to a shared resource in a computing system as recited in claim 14, wherein the first type shared resource transaction passes asynchronous data in an asynchronous manner.

16. A method of controlling access to a shared resource in a computing system as recited in claim 15, wherein the second type device is an isochronous device.

17. A method of controlling access to a shared resource in a computing system as recited in claim 16, wherein the second type shared resource transaction passes isochronous data in an isochronous manner.

18. A method of controlling access to a shared resource in a computing system as recited in claim 17, wherein the isochronous data is digital video data.

19. A computer system, comprising:

a first bus capable of passing data signals and control signals;

a computer system memory device coupled to the bus, the computer system memory device being capable of storing data;

a first bus controller device connected to the computer system memory device and the first bus, the first bus controller being suitably arranged to control the passing of data from the first bus to the computer system memory device and the passing of data from the computer system main memory device to the first bus, and arbiting requests for access to the first bus;

a bus to bus coupling device coupled to the first bus;

a second bus connected by way of the bus to bus coupling device to the first bus;

a first device coupled to the second bus;

a second device coupled to the second bus; and a bus access arbitrator unit coupled between the first device and the second device, the arbitrator unit including an asynchronous access buffer unit to retain access requests from the first type device before access is requested from a shared resource, the arbitrator unit being capable of granting exclusive access to the second type device that is coupled to the shared resource and preventing the first type device from being granted exclusive access to the shared resource while the access requests from the first type device remain in the asynchronous access buffer unit, wherein the arbitrator unit prevents the first type device from exclusive access to the shared resource for at least a duration of time after the second type device has completed an associated second type shared resource transaction.

* * * * *